US005858324A

United States Patent [19]
Dahn et al.

[11] Patent Number: 5,858,324
[45] Date of Patent: Jan. 12, 1999

[54] LITHIUM BASED COMPOUNDS USEFUL AS ELECTRODES AND METHOD FOR PREPARING SAME

[75] Inventors: Jeffrey R. Dahn; Tao Zheng, both of Nova Scotia, Canada

[73] Assignee: Minnesota Mining and Manufacturing Company, St. Paul, Minn.

[21] Appl. No.: 840,872

[22] Filed: Apr. 17, 1997

[51] Int. Cl.⁶ .................... C01G 37/14; C01G 45/00; C01D 15/00
[52] U.S. Cl. ............... 423/596; 423/50; 423/58; 429/224
[58] Field of Search .................. 423/596, 599, 423/50, 58; 429/224

[56] References Cited

U.S. PATENT DOCUMENTS

| | | | |
|---|---|---|---|
| 4,567,031 | 1/1986 | Riley | 423/593 |
| 5,084,366 | 1/1992 | Toyoguchi | 429/224 |
| 5,370,949 | 12/1994 | Davidson et al. | 429/224 |
| 5,531,920 | 7/1996 | Mao et al. | 423/596 |
| 5,540,741 | 7/1996 | Gozdz et al. | 29/623.5 |
| 5,605,773 | 2/1997 | Ellgen | 423/596 |
| 5,631,104 | 5/1997 | Zhong et al. | 423/599 |
| 5,639,438 | 6/1997 | Ellgen | 423/599 |
| 5,677,087 | 10/1997 | Amine et al. | 423/599 |
| 5,683,835 | 11/1997 | Bruce | 423/599 |

FOREIGN PATENT DOCUMENTS

| | | |
|---|---|---|
| 624 525 | 11/1994 | European Pat. Off. . |
| 2 733 632 A | 10/1996 | France . |

OTHER PUBLICATIONS

Chemical Abstracts, vol. 124, No. 10, Mar. 4, 1996, Columbus, Ohio, US; abstract No. 122067, AZUMA: XP002067628.

Davidsonij et al: "Rechargeable Cathodes Based on LI2C4XMN2–X04" Journal of Power Sources, vol. 54, No. 2, Apr. 1, 1995, pp. 205, 208, XP000542220.

Copy of International Search Report for International Application No. PCT/7S98/04940.

Nagaura et al., Lithium Ion Rechargeable Battery, *Progress in Batteries and Solar Cells*, vol. 9, pp. 209–217 (1990), no moNth.

Dahn et al., Rechargeable LiNiO₂ Carbon Cells, *J. Electrochem. Soc.*, vol. 138, pp. 2207–2211 (1991), Aug.

Ohzuku et al., Electrochemistry of Manganese Dioxide in Lithium Nonaqueous Cell, *J. Electrochem. Soc.*, vol. 137, pp. 769–775 (1990), Mar.

Reid, M., Managanese Dioxide Rechargeable Lithium–Ion Battery, paper presented at Power '96, Santa Clara, California, Oct. 13–15, 1996.

Reimers et al., Electrochemical and In Situ X–Ray Diffraction Studies of Lithium Intercalation in $Li_xCoO_2$, *J. Electrochem. Soc.*, vol. 139, pp. 2091–2097 (1992), Aug.

Dahn et al., Structure and Electrochemistry of $Li_{1\pm y}NiO_2$ and a New $Li_2NiO_2$ Phase With the $Ni(OH)_2$ Structure, *Solid State Ionics*, vol. 44, pp. 87–97 (1990), no month.

Gao et al., Synthesis and Characterization of $Li_{1+x}Mn_{2-x}O_4$ for Li–Ion Battery Applications, *J. Electrochem. Soc.*, vol. 143, pp. 100–114 (1996), Jan.

Gummow et al., Improved Capacity Retention in Rechargeable 4 V Lithium Lithium–Manganese Oxide (Spinel) Cells, *Solid State Ionics*, vol. 69, pp. 59–67 (1994), no month.

Ohzuku et al., $LiMnO_2$ As Cathode for Secodary Lithium Cell, *Chemistry Express*, vol. 7, pp. 193–196 (1992), no month.

Reimers et al., Synthesis and Electrochemical Studies of $LiMnO_2$ Prepared at Low Temperatures, *J. Electrochem. Soc.*, vol. 140, pp. 3396–3401 (1993), Dec.

Koetschau et al., Orthorhombic $LiMnO_2$ as a High Capacity Cathode for Li–Ion Cells *J. Electrochem. Soc.*, vol. 142, pp. 2906–2910 (1995), Sep.

Davidson et al., Rechargeable Cathodes Based on $Li_2Cr_xMn_{2-x}O_4$, *J. Power Sources*, vol. 54, pp. 205–208 (1995), no month.

David et al., Structure Refinement of the Spinel–Related Phases of $Li_2Mn_2O_4$ and $Li_{0.2}Mn_2O_4$, *J. Solid State Chemistry*, vol. 67, pp. 316–323 (1987), no month.

Amine et al., A New Three–Volt Spinel $Li_{1+x}Mn_{1.5}Ni_{0.5}O_4$ .for Secondary Lithium Batteries, *J. Electrochem. Soc.*, vol. 143, pp. 1607–1613 (1996), May.

Richard et al., A Cell for In Situ X–Ray Diffraction Based on Coin Cell Hardware and Bellcore Plastic Electrode Technology, *J. Electrochem. Soc.*, vol. 144, pp. 554–557 (1997), Feb.

Li et al., Lattice–Gas Model Approach to Understanding the Structures of Lithium Transition–Metal Oxides $LiMO_2$, *Physical Review*, vol. B49, pp. 826–831 (1994), Jan.

Armstrong et al., Synthesis of Layered $LiMnO_2$ as an Electrode from Rechargeable Lithium Batteries, *Nature*, vol. 381, pp. 499–500 (1996), Jun.

Murphy et al., Ternary $Li_xTiO_2$ Phases from Insertion Reactions, *Solid State Ionics*, vols. 9 and 10, pp. 413–417 (1983), no month.

Reimers et al., Structure and Electrochemistry of $Li_xFe_yNi_{1-y}O_2$, *Solid State Ionics*, vol. 61, pp. 335–344 (1993), no month.

(List continued on next page.)

*Primary Examiner*—Steven Bos
*Attorney, Agent, or Firm*—Leland D. Schultz

[57] ABSTRACT

A process for preparing a compound that includes the steps of: (a) preparing a solution comprising (i) a chromium source, (ii) a manganese source, (iii) a lithium source, and (iv) an oxygen source, where the relative amounts of each of the sources is selected to yield, following step (c), a compound having the formula $Li_yCr_xMn_{2-x}O_{4+z}$ where $y \geq 2$, $0.25 < x < 2$, and $z \geq 0$; (b) treating the solution to form a gel; and (c) heating the gel under an inert atmosphere for a time and at a temperature sufficient to yield a compound having the formula $Li_yCr_xMn_{2-x}O_{4+z}$ where $y \geq 2$, $0.25 < x < 2$, and $z \geq 0$. The invention also features a compound having the formula $Li_yCr_xMn_{2-x}O_{4+z}$ where $y > 2$, $0.25 < x < 2$, and $z \geq 0$, and an electrode composition containing this compound.

16 Claims, 3 Drawing Sheets

OTHER PUBLICATIONS

Tarascon et al., Li Metal–Free Rechargeable Batteries Based on $Li_{1+x}Mn_2O_4$ Cathodes ($0 \leq x \leq 1$) and Carbon Anodes, *J. Electrochem. Soc.*, vol. 138, pp. 2864–2868 (1991), Oct.

Hewston et al., A Survey of First–Row Ternary Oxides $LiMO_2$ (M = Sc–Cu), *J. Phys. Chem. Solids*, vol. 48, pp. 97–108 (1987), no month.

Rosen et al., Structure and Electrochemistry of $Li_xMn_yNi_{1-y}O_2$, *Solid State Ionics*, vol. 57, pp. 311–318 (1992), no month.

Rossen et al., Synthesis and Electrochemistry of Spinel $LT–LiCoO_2$, *Solid State Ionics*, vol. 62, pp. 53–60 (1993), no month.

Wiles et al., *J. Appl. Cryst.*, vol. 14, pp. 149–151 (1981), no month.

LITHIUM BASED COMPOUNDS USEFUL AS ELECTRODES AND METHOD FOR PREPARING SAME

BACKGROUND OF THE INVENTION

This invention relates to preparing compounds useful as electrode compositions for lithium-ion batteries.

Lithium-ion batteries typically feature a pair of electrodes, at least one of which contains lithium in the form of a lithium-transition metal oxide. These batteries offer the advantages of high energy storage capacity and rechargeability. For optimum performance, it is desirable to maximize electrode capacity between cutoff voltages in the range of about 2.5V to about 4.2V vs. lithium metal.

SUMMARY OF THE INVENTION

In a first aspect, the invention features a compound having the formula $Li_yCr_xMn_{2-x}O_{4+z}$ where $y>2$, $0.25<x<2$, and $z \geq 0$. The invention also features an electrode composition that includes this compound. In preferred embodiments, $2<y<2.5$ and $0.5<x \leq 1.5$. In one particularly preferred embodiment, y is about 2.2.

In a second aspect, the invention features a process for preparing a compound that includes the steps of (a) preparing a solution that includes (i) a chromium source, (ii) a manganese source, (iii) a lithium source, and (iv) an oxygen source, the relative amounts of each of the sources being selected to yield, following step (c), a compound having the formula $Li_yCr_xMn_{2-x}O_{4+z}$ where $y \geq 2$, $0.25<x<2$, and $z \geq 0$; (b) treating the solution to form a gel; and (c) heating the gel under an inert atmosphere for a time and at a temperature sufficient to yield a compound having the formula $Li_yCr_xMn_{2-x}O_{4+z}$ where $y \geq 2$, $0.25<x<2$, and $z \geq 0$.

In preferred embodiments, the gel is heated at a temperature less than about 1000° C., preferably less than about 800° C., and more preferably no greater than about 700° C. The solution preferably is an aqueous solution. The gel is preferably formed by treating the solution with ammonium hydroxide.

The chromium, manganese, lithium, and oxygen sources may be in the form of four separate materials, or in the form of a material that combines two or more of these elements. For example, the chromium source preferably is a compound consisting essentially of chromium and at least one additional element selected from the group consisting of oxygen, nitrogen, carbon, and hydrogen. An example of such a chromium source is a chromium salt such as chromium nitrate. This material acts as a source of both chromium and oxygen. Similarly, the manganese source preferably is a compound consisting essentially of manganese and at least one additional element selected from the group consisting of oxygen, nitrogen, carbon, and hydrogen. An example is a manganese salt such as manganese acetate. Similar to the case of chromium nitrate, this material acts as a source of both manganese and oxygen. The lithium source preferably is a compound consisting essentially of lithium and at least one additional element selected from the group consisting of oxygen, nitrogen, carbon, and hydrogen. An example is a lithium salt such as lithium hydroxide, a material which acts as a source of both lithium and oxygen.

According to one embodiment, the chromium, manganese, lithium, and oxygen sources are selected to yield, following step (c), a compound having the formula $L_yCr_xMn_{2-x}O_{4+z}$ where $y>2$, $0.25<x<2$, and $z \geq 0$. In another embodiment, the chromium, manganese, lithium, and oxygen sources are selected to yield, following step (c), a compound having the formula $L_yCr_xMn_{2-x}O_{4+z}$ where $y>2$, $0.5<x \leq 1.5$, and $z \geq 0$. In a third embodiment, the chromium, manganese, lithium, and oxygen sources are selected to yield, following step (c), a compound having the formula $Li_yCr_xMn_{2-x}O_{4+z}$ where $y=2$, $0.25<x<2$, and $z \geq 0$. In a fourth embodiment, the chromium, manganese, lithium, and oxygen sources are selected to yield, following step (c), a compound having the formula $L_yCr_xMn_{2-x}O_{4+z}$ where $y=2$, $1.0 \leq x \leq 1.5$, and $z \geq 0$.

In a third aspect, the invention features a lithium ion battery that includes: (a) a first electrode that includes a compound having the formula $Li_yCr_xMn_{2-x}O_{4+z}$ where $y \geq 2$, $0.25<x<2$, and $z \geq 0$; (b) a second electrode; and (c) an electrolyte, in which the first electrode has a reversible specific capacity of at least 100 mAh/g in the range 2.5V–4.2V vs. Li metal when discharged at a rate corresponding to full discharge in 10 hours or less.

The invention provides compounds useful as electrode compositions (e.g., cathode compositions) for lithium-ion batteries. The electrode compositions exhibit good performance, as measured, e.g., by reversible specific capacity in the range 2.5V–4.2V vs. lithium metal. Lithium-ion batteries incorporating such electrode compositions may be repeatedly cycled without substantial loss of performance. The compounds are prepared using a sol-gel process that proceeds under relatively mild conditions (e.g., at temperatures preferably less than about 1000° C.) and requires relatively short reaction times (e.g., on the order of 10–24 hours).

Compounds in which y is greater than 2 offer the advantage of minimizing the presence of transition metals (i.e., chromium and manganese) in the lithium layers of the layered oxide. Such transition metals can prevent the free diffusion of intercalated lithium, leading to materials having poor intercalation kinetics and poor performance in lithium batteries.

Other features and advantages of the invention will be apparent from the following description of the preferred embodiments thereof, and from the claims.

DESCRIPTION OF THE PREFERRED EMBODIMENTS

Lithium-chromium-manganese oxides described herein have the general formula $L_yCr_xMn_{2-x}O_{4+z}$ where $y \geq 2$, $0.25<x<2$, and $z \geq 0$. These oxides are particularly useful as electrode compositions for lithium-ion batteries. They are preferably prepared in a sol-gel process in which chromium, lithium, manganese, and oxygen sources are combined to form a solution (preferably an aqueous solution), which is then converted to a gel by the addition of a reagent such as ammonium hydroxide ($NH_4OH$). The gel is then heated under an inert atmosphere (e.g., an argon atmosphere) to convert the gel to the desired oxide.

A variety of materials may be used as the chromium, lithium, manganese, and oxygen sources as long as they are soluble in the medium used to prepare the gel. For example, in the case of aqueous solutions, the chromium, lithium, manganes, and oxygen sources must be water-soluble. A single material may serve as a source for more than one of these elements.

Preferred materials are those in which the elemental constituents (with the exception of chromium, lithium, manganese, and at least some of the oxygen) form volatile by-products during the heating step such that these elemental constituents do not become part of the final oxide product. The resulting oxide product, therefore, contains only lithium, chromium, manganese, and oxygen as its elemental constituents. In this way, the oxide product is essentially free of impurities which might otherwise compromise electrode performance.

Examples of suitable materials include nitrogen-containing compounds (which can liberate nitrogen-containing gas during heating), carbon-containing compounds (which can liberate, e.g., carbon dioxide and/or carbon monoxide during heating), and hydrogen-containing compounds (which can liberate, e.g., water vapor during heating). Specific examples include nitrates, hydroxides, and esters of organic acids such as acetates, citrates, tartrates, and oxalates.

The heating temperature and stoichiometric ratios of reactants determine the crystal structure (and associated parameters such as lattice constants and unit cell volume) of the oxide product, as well as whether the product is a single or multi-phase material. In general, temperatures less than 1000° C. are preferred, with temperatures in the range 500°–700° C. being particularly preferred.

The invention will now be described further by way of the following examples.

EXAMPLES

Electrochemical Cell Prepartion

Electrodes were prepared as follows. About 12 wt. % $Li_yCr_xMn_{2-x}O_{4+z}$ (prepared as described below), 6 wt. % Kynar Flex 2801 (a vinylidene fluoride-hexafluoropropylene copolymer commercially available from Atochem), 10 wt. % EC/PC (ethylene carbonate/propylene carbonate, 50/50 by volume), 1.5 wt. % Super S carbon black (commercially available from MMM Carbon, Belgium), and 70.5 wt. % acetone were thoroughly mixed by stirring in a sealed bottle at 50° C. for four hours to form a slurry. The slurry was then spread in a thin layer (about 150 micrometers thick) on a glass plate using a doctor blade spreader. After evaporating the acetone, the resulting film was peeled from the glass and a circular electrode measuring 1 cm in diameter was punched from the film using an electrode punch. The circular electrode was then weighed and the active mass (the total weight of the circular electrode multiplied by the fraction of the electrode weight made up by $Li_yCr_xMn_{2-x}O_{4+z}$) calculated, after which the circular electrode was sealed in a polyethylene bag with heat sealer until used to assemble an electrochemical cell.

To assemble an electrochemical cell, each circular electrode was first placed in diethyl ether for about 5 minutes to remove EC/PC and form pores in the electrode that the electrolyte will fill during cell construction. The electrodes were then taken into an argon-filled glove box where the electrochemical cell was constructed.

Figure 3:
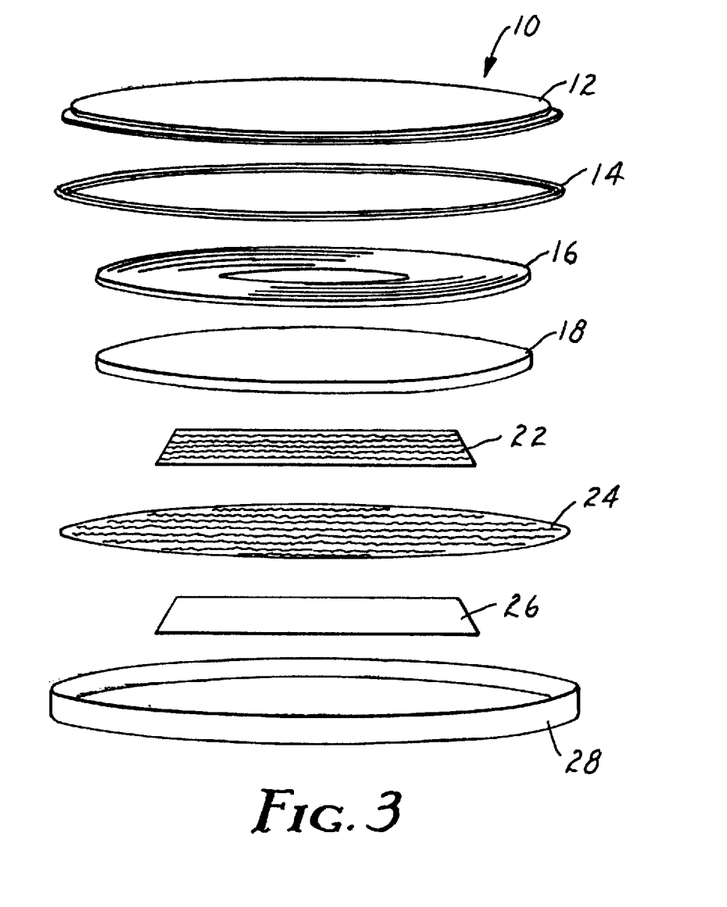
FIG. 3 is an exploded perspective view of an electrochemical cell used to test various electrode compositions.

An exploded perspective view of the electrochemical cell is shown in FIG. 3. The anode was a lithium foil having a thickness of 125 micrometers; the anode also functioned as a reference electrode. The cell featured 2320 coin-cell hardware, equipped with a spacer plate (304 stainless steel) and a disc spring (mild steel). The disc spring was selected so that a pressure of about 15 bar would be applied to each of the cell electrodes when the cell was crimped closed. The separator was a Celgard #2502 microporous polypropylene film (Hoechst-Celanese) which had been wetted with a 1M solution of $LiPF_6$ dissolved in a 30:70 volume mixture of ethylene carbonate and diethyl carbonate (Mitsubishi Chemical).

Synthesis

Example 1

50.524 g (0.125 moles) of $Cr(NO_3)_3.9H_2O$ (Aldrich Chemical Co., 99%) and 18.38 g (0.075 moles) of $Mn(CH_3COO)_2.4H_2O$ (Aldrich Chemical Co.) were dissolved in 80 mls of distilled water to form a transition metal solution. In a separate beaker, 8.564 g (0.2 moles) of $LiOH.H_2O$ (FMC Corp., 98%) was dissolved in 70 mls of distilled water. While stirring, the LiOH solution was added dropwise to the transition metal solution over a period of about 5 minutes. The solution was stirred for about 15 minutes. Finally, about 10 mls of $NH_4OH$ was added dropwise over about 5 minutes to form a gel. The gel was then placed in a "Fisher-Brand" muffle oven set to 170° C. to dry and solidify the gel overnight in air. After initial drying, the solidified gel was powdered in a Retsch model Rm-0 automatic grinder for about 10 minutes.

The powdered gel was then heated to 500° C. using a Lindberg tube furnace equipped with stainless steel furnace tubes and sealed end caps. After the gel had been loaded into the furnace tube, but before initiating heating, the end caps were sealed, and the furnace tube thoroughly purged with UHP-grade argon (Canadian Liquid Air), to remove unwanted air.

UHP-grade argon was passed at a rate of about 150 cc/min through fittings in the sealed end caps during the synthesis. The heating profile was as follows: from 30° C. to 150° C. in 20 minutes, followed by a 3 hour soak at 150° C. The sample was then heated to 500° C. in 40 minutes, soaked for 10 hours, and cooled to room temperature in about one hour to yield a compound having the formula $Li_2Cr_{1.25}Mn_2O_{4+z}$ where $z \geq 0$.

Figure 1:
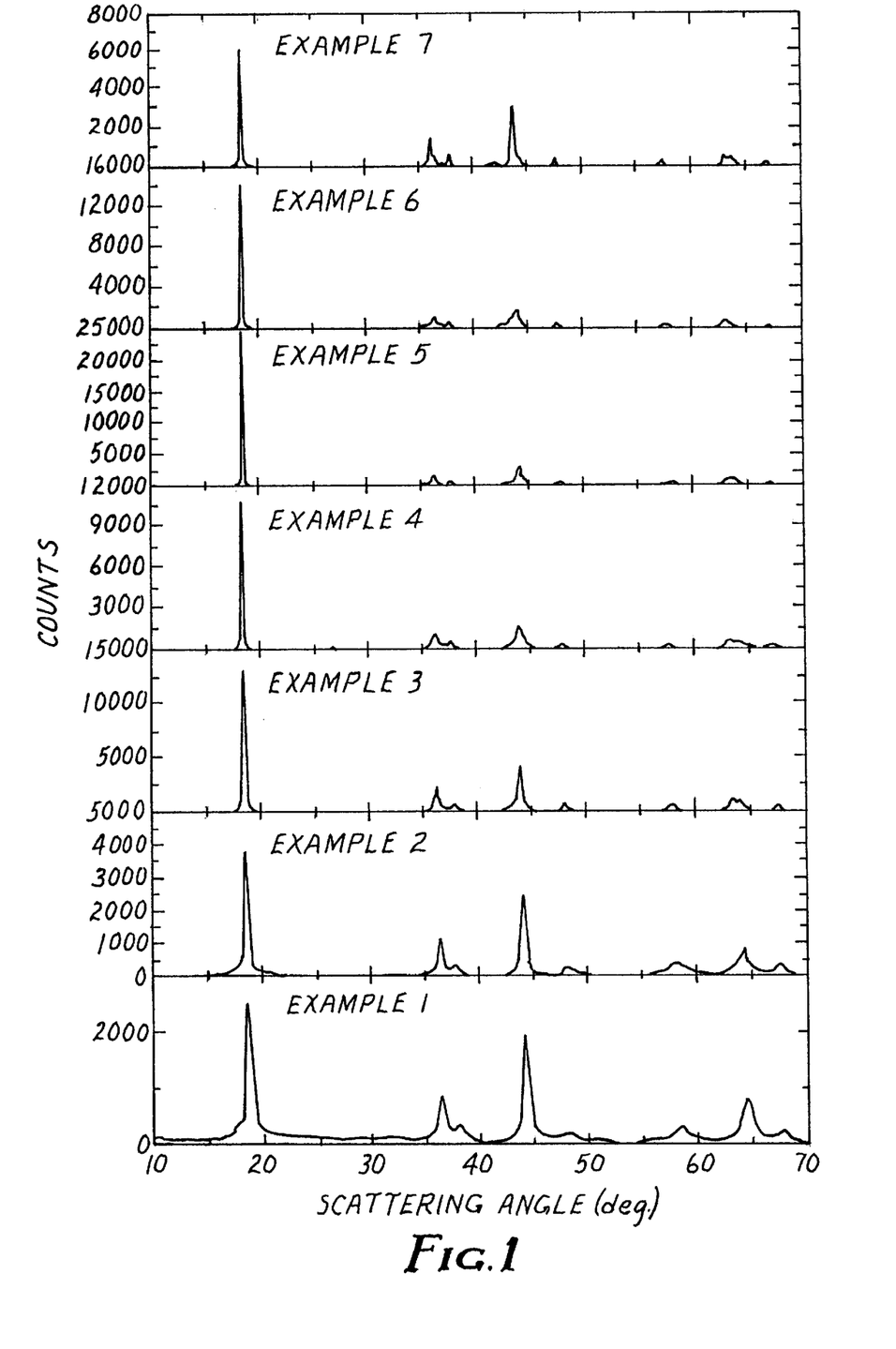
FIG. 1 is a series of x-ray diffraction profiles for the materials prepared according to Examples 1–7.
Figure 2:
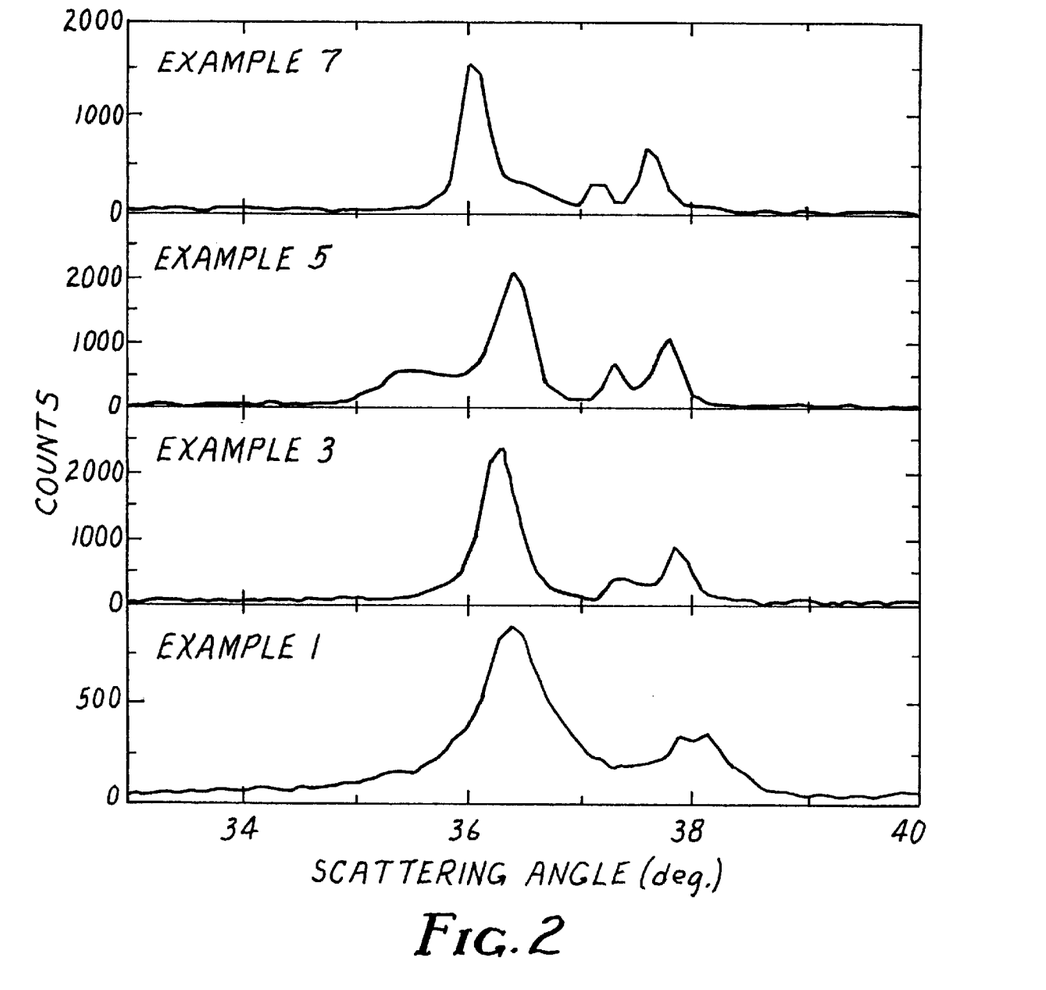
FIG. 2 is a series of expanded views of the x-ray diffraction profiles in the range from 33 to 40 degrees for the materials prepared according to Examples 1, 3, 5, and 7.

A powder x-ray diffraction pattern for the product was collected using a Siemens D5000 diffractometer equipped with a copper target X-ray tube and a diffracted beam monochromator. Data was collected between scattering angles of 10 degrees and 130 degrees. A portion of the x-ray diffraction profile is shown in FIG. 1. An expanded view of the profile in the range from 33 to 40 degrees is shown in FIG. 2.

The crystal structure was determined based upon the x-ray diffraction data as described in (a) C. J. Howard and R. J. Hill, Australian Atomic Energy Commission Report No. M112 (1986); and (b) D. B. Wiles and R. A. Young, J. Appl. Cryst., 14:149–151 (1981). The diffraction pattern of the sample can be fit by either of two "homeomorphic" crystal structures. These are the layered $LiCoO_2$-like structure with $c/a=(24)^{1/2}$ which gives Bragg peaks in the same positions and with the same powder intensities as the cubic spinel-related structure (space group Fd3m) with cations in 16$c$ (Li) and 16$d$ (Mn,Cr) positions. This structure will be designated "cub/hex."

Lattice constants were determined using least squares refinements to the positions of calculated and measured Bragg peak positions, and were used to calculate unit volume according to the procedure described in standard x-ray diffraction texts, e.g., B. D. Warren, *X-Ray Diffraction*, Addison-Wesley, Reading, Mass. (1969). The unit volume refers to the volume of the crystal per formula unit of the material, the formula unit being $L_yCr_xMn_{2-x}O_{4+z}$. For the cub/hex structure indexed on the cubic spinel-related unit cell, the unit cell contains 9 formula units. For the cub/hex structure indexed on the hexagonal unit cell, the unit cell contains 3/2 formula units. For the hex structure, indexed on the hexagonal unit cell, the unit cell contains 3/2 formula units. For the d-hex structure, the unit cell contains 1 formula unit.

The lattice constants and unit volume for the sample are set forth in Table 1. A comparison of the measured and calculated Bragg peak positions is set forth in Table 2. The calculated values were obtained assuming a layered structure with space group R-3M. The lattice constants used were a=2.895 Å and c=14.190 Å.

Examples 2–7

Examples 2–7 were prepared following the procedure in Example 1 except that a 2 gram sample of the powdered material was further subjected to a heat treatment in the furnace for 24 hours at the following temperatures: 600° C. (Example 2), 700° C. (Example 3), 800° C. (Example 4), 900° C. (Example 5), 1000° C. (Example 6), and 1100° C. (Example 7). In the case of samples prepared above 700° C., quartz furnace tubes were used. Powder x-ray diffraction patterns were obtained for each sample and are shown in FIGS. 1 and 2.

The crystal structure, lattice constants, and unit volume were determined for each sample (with the exception of Examples 4 and 6) according to the procedure in Example 1. The results are summarized in Table 1.

The material prepared in Example 2 had a cub/hex structure.

The material prepared in Example 3 exhibited the "layered $LiCoO_2$" structure, which will be designated "hex" here. The measured and calculated Bragg peak positions for Example 3 are shown in Table 3. The calculated values were obtained assuming a layered structure with space group R-3M. The lattice constants used were a=2.903 Å and c=14.426 Å.

The crystal structure of the material prepared in Example 5 was a layered one, but with a small distortion, analogous to that recently found for layered $LiMnO_2$ by Armstrong and Bruce, Nature 381:499 (1996). The observed and calculated Bragg peak positions for Example 5 are summarized in Table 4. This structure will be designated "d-hex", short for "distorted hexagonal." The calculated values were obtained assuming a layered structure with space group C 2/M. The lattice constants used were a=5.118 Å, b=2.880 Å, c=5.161 Å and beta=110.94°.

The crystal structure of the material prepared in Example 7 was also a layered or "hex" structure, but with substantially different Bragg peak positions compared to Example 3. The observed and calculated Bragg peak positions for Example 7 are summarized in Table 5. The calculated values were obtained assuming a layered structure with space group R-3M. The lattice constants used were a=2.9259 Å and c=14.537 Å.

The material prepared in Example 4 was a two phase mixture of the materials of Examples 3 and 5. The material prepared in Example 6 was a two phase mixture of the materials of Examples 5 and 7.

Several electrochemical cells were constructed according to the procedure described above using, as the cathode, samples prepared according to Example 3. Specifically, four cells were prepared using the material of Example 3 and cycled between voltage limits of 2.5V and 4.2V using currents of (a) 1.5 mA/g ("3-1"), (b) 3.75 mA/g ("3-2"), and (c) 15 mA/g (two cells) ("3-3" and "3-4"). The first charge capacity, first discharge capacity, and time taken to deliver 148 mAh/g were determined and the results reported in Table 6. The data demonstrates that the capacity is maintained as the current is increased.

Example 8

Example 8 was prepared following the procedure set forth in Example 1 except that the relative amounts of reactants $(Cr(NO_3)_3.9H_2O$, $Mn(CH_3COO)_2.4H_2O$, and $LiOH.H_2O)$ were selected to yield a product having the formula $Li_2Cr_{1.0}Mn_{1.0}O_{4+z}$ where $z \geq 0$. The crystal structure, lattice constants, and unit cell volume were determined as described in Example 1 and are reported in Table 1.

Examples 9–14

Examples 9–14 were prepared following the procedure in Example 8 except that a 2 gram sample of the powdered material was further subjected to a heat treatment in the furnace for 24 hours at the following temperatures: 600° C. (Example 9), 700° C. (Example 10), 800° C. (Example 11), 900° C. (Example 12), 1000° C. (Example 13), and 1100° C. (Example 14). In the case of samples prepared above 700° C., quartz furnace tubes were used. The crystal structure, lattice constants, and unit cell volume for each sample (with the exception of Examples 9 and 11) were determined as described in Example 8 and are reported in Table 1.

An electrochemical cell was constructed as described above using the material of Example 10, and cycled between voltage limits of 2.5V and 4.2V using a current of 15 mA/g. The first charge capacity, first discharge capacity, and time taken to deliver 148 mAh/g were determined and the results reported in Table 6.

Example 15

Example 15 was prepared following the procedure set forth in Example 1 except that the relative amounts of reactants $(Cr(NO_3)_3.9H_2O$, $Mn(CH_3COO)_2.4H_2O$, and $LiOH.H_2O)$ were selected to yield a product having the formula $Li_2Cr_{1.5}Mn_{0.5}O_{4+z}$ where $z \geq 0$. The crystal structure was determined as described in Example 1 and is reported in Table 1.

Examples 16–21

Examples 16–21 were prepared following the procedure in Example 15 except that a 2 gram sample of the powdered material was further subjected to a heat treatment in the furnace for 24 hours at the following temperatures: 600° C. (Example 16), 700° C. (Example 17), 800° C. (Example 18), 900° C. (Example 19), 1000° C. (Example 20), and 1100° C. (Example 21). In the case of samples prepared above 700° C., quartz furnace tubes were used. The crystal structure, lattice constants, and unit cell volume for each sample (with the exception of Example 18) were determined as described in Example 1 and are reported in Table 1.

An electrochemical cell was constructed as described above using the material of Example 17, and cycled between voltage limits of 2.5V and 4.2V using a current of 15 mA/g. The first charge capacity, first discharge capacity, and time taken to deliver 148 mAh/g were determined and the results reported in Table 6.

Example 22

Example 22 was prepared following the procedure set forth in Example 1 except that the relative amounts of reactants $(Cr(NO_3)_3.9H_2O$, $Mn(CH_3COO)_2.4H_2O$, and $LiOH.H_2O)$ were selected to yield a product having the formula $Li_{2.2}Cr_{1.25}Mn_{0.75}O_{4+z}$ where $z \geq 0$. The crystal structure, lattice constants, and unit cell volume were determined as described in Example 1 and is reported in Table 1.

Example 23

Example 23 was prepared following the procedure set forth in Example 22 except that a 2 gram sample of the powdered material was further subjected to a heat treatment in the furnace for 24 hours at 700° C. The crystal structure, lattice constants, and unit cell volume for the sample were determined as described in Example 1 and are reported in Table 1.

An electrochemical cell was constructed as described above using the material of Example 23, and cycled between voltage limits of 2.5V and 4.2V using a current of 15 mA/g. The first charge capacity, first discharge capacity, and time taken to deliver 148 mAh/g were determined and the results reported in Table 6.

Example 24

Example 24 was prepared following the procedure set forth in Example 1 except that the relative amounts of reactants ($Cr(NO_3)_3 \cdot 9H_2O$, $Mn(CH_3COO)_2 \cdot 4H_2O$, and $LiOH \cdot H_2O$) were selected to yield a product having the formula $Li_2Cr_{0.5}Mn_{1.5}O_{4+z}$ where $z \geq 0$, and the firing temperature was 300° C. The crystal structure, lattice constants, and unit cell volume were not determined.

Examples 25–30

Examples 25–30 were prepared following the procedure in Example 24 except that a 2 gram sample of the powdered material was further subjected to a heat treatment in the furnace for 24 hours at the following temperatures: 600° C. (Example 25), 700° C. (Example 26), 800° C. (Example 27), 900° C. (Example 28), 1000° C. (Example 29), and 1100° C. (Example 30). In the case of samples prepared above 700° C., quartz furnace tubes were used. The crystal structure, lattice constants, and unit cell volume were not determined.

Example 31

Example 31 was prepared following the procedure set forth in Example 1 except that the relative amounts of reactants ($Cr(NO_3)_3 \cdot 9H_2O$, $Mn(CH_3COO)_2 \cdot 4H_2O$, and $LiOH \cdot H_2O$) were selected to yield a product having the formula $Li_2Cr_{0.75}Mn_{1.25}O_{4+z}$ where $z \geq 0$. The crystal structure, lattice constants, and unit cell volume for the sample were determined as described in Example 1 and are reported in Table 1.

Examples 32–37

Examples 32–37 were prepared following the procedure in Example 32 except that a 2 gram sample of the powdered material was further subjected to a heat treatment in the furnace for 24 hours at the following temperatures: 600° C. (Example 32), 700° C. (Example 33), 800° C. (Example 34), 900° C. (Example 35), 1000° C. (Example 36), and 1100° C. (Example 37). In the case of samples prepared above 700° C., quartz furnace tubes were used. The crystal structure, lattice constants, and unit cell volume of Example 36 were determined as described in Example 31 and are reported in Table 1. The crystal structure, lattice constants, and unit cell volume for the remaining examples were not determined.

TABLE 1

| Sample | Cr concentration | Heating conditions | Structure type | a(Å) | b(Å) | c(Å) | volume of unit cell (Å³) |
|---|---|---|---|---|---|---|---|
| 1 | 1.25 | 500C, Ar, 10 hrs | cub/hex | 2.895 | | 14.190 | 68.62 |
| 2 | 1.25 | 600C, Ar, 24 hrs | cub/hex | 2.894 | | 14.220 | 68.78 |
| 3 | 1.25 | 700C, Ar, 24 hrs | hex | 2.903 | | 14.426 | 70.18 |
| 4 | 1.25 | 800C, Ar, 24 hrs | | | | | |
| 5 | 1.25 | 900C, Ar, 24 hrs | d-hex | 5.118 | 2.880 | 5.161 | 71.07 |
| 6 | 1.25 | 1000C, Ar, 24 hrs | | | | | |
| 7 | 1.25 | 1100C, Ar, 24 hrs | hex | 2.926 | | 14.537 | 71.84 |
| 8 | 1.0 | 500C, Ar, 10 hrs | cub/hex | 2.894 | | 14.198 | 68.63 |
| 9 | 1.0 | 600C, Ar, 10 hrs | | | | | |
| 10 | 1.0 | 700C, Ar, 24 hrs | hex | 2.901 | | 14.357 | 69.78 |
| 11 | 1.0 | 800C, Ar, 24 hrs | | | | | |
| 12 | 1.0 | 900C, Ar, 24 hrs | d-hex | 5.175 | 2.855 | 5.201 | 71.239 |
| 13 | 1.0 | 1000C, Ar, 24 hrs | d-hex | 5.183 | 2.863 | 5.210 | 71.663 |
| 14 | 1.0 | 1100C, Ar, 24 hrs | d-hex | 5.195 | 2.862 | 5.223 | 71.901 |
| 15 | 1.5 | 500C, Ar, 20 hrs | cub/hex | | | | |
| 16 | 1.5 | 600C, Ar, 24 hrs | hex | 2.900 | | 14.205 | 68.98 |
| 17 | 1.5 | 700C, Ar, 24 hrs | hex | 2.899 | | 14.431 | 70.03 |
| 18 | 1.5 | 800C, Ar, 24 hrs | | | | | |
| 19 | 1.5 | 900C, Ar, 24 hrs | hex | 2.910 | | 14.456 | 70.66 |
| 20 | 1.5 | 1000C, Ar, 24 hrs | hex | 2.908 | | 14.447 | 70.55 |
| 21 | 1.5 | 1100C, Ar, 24 hrs | hex | 2.915 | | 14.458 | 70.92 |
| 22 | Li(2.2) Cr(1.25) | 500C, Ar, 10 hrs | Cub/hex | 2.823 | | 14.185 | 68.532 |
| 23 | Li(2.2) Cr(1.25) | 700C Ar, 24 hrs | hex | 2.8967 | | 14.41 | 69.81 |
| 24 | 0.5 | 300C, air, 10 hrs | | | | | |
| 25 | 0.5 | 600C, Ar, 24 hrs | | | | | |
| 26 | 0.5 | 700C, Ar, 24 hrs | | | | | |

TABLE 1-continued

| Sample | Cr concentration | Heating conditions | Structure type | a(Å) | b(Å) | c(Å) | volume of unit cell (Å³) |
|---|---|---|---|---|---|---|---|
| 27 | 0.5 | 800C, Ar, 24 hrs | | | | | |
| 28 | 0.5 | 900C, Ar, 24 hrs | | | | | |
| 29 | 0.5 | 1000C, Ar, 24 hrs | | | | | |
| 30 | 0.5 | 1100C, Ar, 24 hrs | | | | | |
| 31 | 0.75 | 500C, Ar, 10 hrs | cub/hex | 2.892 | | 14.173 | 68.45 |
| 32 | 0.75 | 600C, Ar, 24 hrs | | | | | |
| 33 | 0.75 | 700C, Ar, 24 hrs | | | | | |
| 34 | 0.75 | 800C, Ar, 24 hrs | | | | | |
| 35 | 0.75 | 900C, Ar, 24 hrs | | | | | |
| 36 | 0.75 | 1000C, Ar, 24 hrs | hex | 5.230 | 2.846 | 5.243 | 71.86 |
| 37 | 0.75 | 1100C, Ar 24 hrs | | | | | |

TABLE 2

| Miller Indices (hkl) | Observed Angle (deg.) | Calculated Angle (deg.) |
|---|---|---|
| 0,0,3 | 18.67 | 18.759 |
| 1,0,−1 | 36.49 | 36.395 |
| 0,0,6 | 38.10 | 38.046 |
| 1,0,2 | 38.10 | 38.072 |
| 1,0,−4 | 44.26 | 44.241 |
| 1,0,5 | 48.34 | 48.449 |
| 1,0,−7 | 58.54 | 58.558 |
| 1,0,8 | 64.39 | 64.335 |
| 1,1,0 | 64.39 | 64.371 |
| 1,1,3 | 67.65 | 67.702 |

TABLE 3

| Miller Indices (hkl) | Oberserved Angle (deg.) | Calculated Angle (deg.) |
|---|---|---|
| 0,0,3 | 18.46 | 18.449 |
| 1,0,−1 | 36.27 | 36.273 |
| 0,0,6 | 37.38 | 37.399 |
| 1,0,2 | 37.89 | 37.901 |
| 1,0,−4 | 43.93 | 43.900 |
| 1,0,5 | 47.99 | 47.998 |
| 1,0,−7 | 57.90 | 57.852 |
| 1,0,8 | 63.45 | 63.484 |
| 1,1,0 | 64.14 | 64.167 |
| 1,1,3 | 67.40 | 67.396 |
| 2,0,1 | 76.02 | 75.998 |

TABLE 4

| Miller Indices (hkl) | Observed Angle (deg.) | Calculated Angle (deg.) |
|---|---|---|
| 0,0,1 | 18.43 | 18.403 |
| 2,0,−1 | 35.49 | 35.459 |
| 1,1,0 | 36.43 | 36.416 |
| 0,0,2 | 37.32 | 37.304 |
| 1,1,−1 | 37.70 | 37.773 |
| 2,0,−2 | 42.68 | 42.709 |
| 1,1,1 | 44.23 | 44.215 |
| 1,1,−2 | 47.72 | 47.634 |
| 2,0,−3 | 56.42 | 56.440 |
| 0,0,3 | 57.33 | 57.336 |
| 1,1,2 | 58.20 | 58.234 |

TABLE 5

| Miller Indices (hkl) | Observed Angle (deg.) | Calculated Angle (deg.) |
|---|---|---|
| 0,0,3 | 18.30 | 18.308 |
| 1,0,−1 | 35.99 | 35.976 |
| 0,0,6 | 37.11 | 37.106 |
| 1,0,2 | 37.57 | 37.591 |
| 1,0,−4 | 43.55 | 43.540 |
| 1,0,5 | 47.61 | 47.602 |
| 1,0,−7 | 57.36 | 57.364 |
| 1,0,8 | 62.95 | 62.949 |
| 1,1,0 | 63.62 | 63.599 |
| 1,1,3 | 66.79 | 66.794 |

TABLE 6

| Material | Example | Heating Temp. (°C.) | Unit cell volume (Å³) | First Charge capacity (mAh/g) | Upper cutoff voltage (V) | First discharge capacity (mAh/g) | Time taken to deliver 148 mAh/g (hours) |
|---|---|---|---|---|---|---|---|
| Li$_2$Cr$_{1.25}$Mn$_{0.75}$O$_4$ | 3-1 | 700° C. | 70.22 | 178 | 4.2 | 150 | 100 |
| Li$_2$Cr$_{1.25}$Mn$_{0.75}$O$_4$ | 3-2 | 700° C. | 70.22 | 166 | 4.2 | 137 | 40 |
| Li$_2$Cr$_{1.25}$Mn$_{0.75}$O$_4$ | 3-3 | 700° C. | 70.22 | 138 | 4.2 | 106 | 10 |
| Li$_2$Cr$_{1.25}$Mn$_{0.75}$O$_4$ | 3-4 | 700° C. | 70.22 | 206 | 4.5* | 137 | 10 |
| Li$_{2.2}$Cr$_{1.25}$Mn$_{0.75}$O$_4$ | 23 | 700° C. | 69.81 | 175 | 4.2 | 117 | 10 |
| Li$_2$Cr$_{1.5}$Mn$_{0.5}$O$_4$ | 17 | 700° C. | 70.03 | 159 | 4.2 | 110 | 10 |
| Li$_2$Cr$_{1.0}$Mn$_{1.0}$O$_4$ | 10 | 700° C. | 69.78 | 170 | 4.2 | 110 | 10 |

*Same capacity expected at 4.2V upper cutoff due to shape of voltage profile.

Other embodiments are within the following claims.

What is claimed is:

1. A process for preparing a compound comprising the steps of:
   (a) preparing a solution comprising (i) a chromium source, (ii) a manganese source, (iii) a lithium source, and (iv) an oxygen source, the relative amounts of each of said sources being selected to yield, following step (c), a compound having the formula $Li_yCr_xMn_{2-x}O_{4+z}$ where $y \geq 2$, $0.25<x<2$, and $z \geq 0$;

(b) treating said solution to form a gel; and (c) heating said gel under an inert atmosphere for a time and at a temperature sufficient to yield a compound having the formula $L_yCr_xMn_{2-x}O_{4+z}$ where $y \geq 2$, $0.25<x<2$, and $z \geq 0$.

2. A process according to claim 1 comprising heating said gel at a temperature less than about 1000° C.

3. A process according to claim 1 comprising heating said gel at a temperature less than about 800° C.

4. A process according to claim 1 comprising heating said gel at a temperature no greater than about 700° C.

5. A process according to claim 1 comprising selecting each of said sources to yield, following step (c), a compound having the formula $Li_yCr_xMn_{2-x}O_{4+z}$ where $y>2$, $0.25<x<2$, and $z \geq 0$.

6. A process according to claim 1 comprising selecting each of said sources to yield, following step (c), a compound having the formula $Li_yCr_xMn_{2-x}O_{4+z}$ where $y>2$, $0.5<x \leq 1.5$, and $z \geq 0$.

7. A process according to claim 1 comprising selecting each of said sources to yield, following step (c), a compound having the formula $Li_yCr_xMn_{2-x}O_{4+z}$ where $y=2$, $0.25<x<2$, and $z \geq 0$.

8. A process according to claim 1 comprising selecting each of said sources to yield, following step (c), a compound having the formula $Li_yCr_xMn_{2-x}O_{4+z}$ where $y=2$, $1.0 \leq x \leq 1.5$, and $z \geq 0$.

9. A process according to claim 1 wherein said solution comprises an aqueous solution.

10. A process according to claim 1 comprising treating said solution with ammonium hydroxide to form said gel.

11. A process according to claim 1 wherein said chromium source comprises a compound consisting essentially of chromium and at least one additional element selected from the group consisting of oxygen, nitrogen, carbon, and hydrogen.

12. A process according to claim 1 wherein said chromium source comprises chromium nitrate.

13. A process according to claim 1 wherein said manganese source comprises a compound consisting essentially of manganese and at least one additional element selected from the group consisting of oxygen, nitrogen, carbon, and hydrogen.

14. A process according to claim 1 wherein said manganese source comprises manganese acetate.

15. A process according to claim 1 wherein said lithium source comprises a a compound consisting essentially of lithium and at least one additional element selected from the group consisting of oxygen, nitrogen, carbon, and hydrogen.

16. A process according to claim 1 wherein said lithium source comprises lithium hydroxide.

* * * * *